2,987,502
ELASTOMERS

Louis L. Ferstandig, El Cerrito, and Philip S. Magee, San Rafael, Calif., assignors to California Research Corporation, San Francisco, Calif., a corporation of Delaware
No Drawing. Filed Sept. 2, 1959, Ser. No. 837,576
4 Claims. (Cl. 260—63)

This invention relates to the production of novel elastomeric materials useful in various applications requiring a tough material having resiliency, for example in mounting applications where resilient supports are required. More particularly, the invention relates to the production of polyesters of the polybasic acid-polyhydric alcohol type having elastomeric properties.

It is known that resilient Vulcollan-type polymers can be prepared that embody cross-linking that contributes to the resiliency of the polymer. However, it is also known that this resiliency can be imparted to the polymer only by means of various expensive and relatively complicated expedients, for example by the use of diisocyanates.

It has now been found that an elastomeric polybasic acid-polyhydric alcohol type polyester can be prepared with good elastic properties without the use of the expensive and complicated expedients mentioned above, without sacrifice in other desirable properties of the product, including toughness and an adequately high heat distortion point to provide the necessary stability for such purposes as resilient mounting in many conventional applications.

In accordance with the present invention, there is provided a process for producing elastomeric materials which comprises reacting a ketopimelic acid with a glycol in the presence of an esterification catalyst, to produce a polyester having keto substituents, and reacting said polyester with a glycol to accomplish a substantial amount of cross-linking of said polyester through said keto substituents, thereby imparting the desired elastomeric properties to the product.

The ketopimelic acid may be 2-ketopimelic acid or 4-ketopimelic acid. The latter is preferred, although 2-ketopimelic acid is very similar and when used in the present process also produces the novel elastomeric materials described herein. These materials are characterized by substantial cross-linking by ketol formation through the keto groups, toughness, and resiliency.

The process of the present invention may be operated in one stage. However, it will usually be preferable to operate the process in two stages, in the first of which the esterification reaction is conducted, and in the second of which the desired cross-linking is accomplished. Operation in this manner can give process flexibility for certain purposes. For example, it may be desired to vary the nature of the product polymer by using a particular glycol, for example ethylene glycol, in the first stage, and a different glycol, for example 1,6-hexane diol, in the second stage. Alternatively, or in addition, it may be desired to use an excess of glycol in the first stage and carry the excess into the second stage. Another alternative or additional operation that may be carried out is the introduction of conventional foaming agents into the second stage.

The glycol used to accomplish esterification may be any glycol operable in the presence of a conventional esterification catalyst to produce a polyester having keto substituents. The glycol used to accomplish cross-linking likewise may be any glycol operable to cause ketol formation. However, for both purposes a lower aliphatic glycol, for example ethylene glycol or 1,3-propylene glycol is preferred. For single stage operation the glycol and the ketopimelic acid may be used in approximately equimolar amounts, although a slight molar excess of the glycol is desirable. For two-stage operation sufficient glycol should be used in the first stage to produce adequate esterification, and in the second stage to produce a substantial amount of cross-linking. As the chain length of the glycol used is increased, the flexibility of the product polymer also is increased.

The polyesterification reaction between the ketopimelic acid and the glycol will proceed thermally; however, in such case the reaction is undesirably slow. Therefore, conventional esterification catalysts that will greatly accelerate the reaction should be used, for example, zinc chloride, sulfuric acid, or boron trifluoride. In two-stage operation it is not necessary to add additional catalyst in the second stage.

In single-stage operation reaction of the acid with the glycol preferably is accomplished at generally atmospheric pressures and at about from 190° to 300° C., more preferably at about from 200° to 250° C., for a period of time, generally from about 2.8 to 4.5 hours, sufficient to produce a reaction mixture, substantially comprising a polyester which, upon cooling, will be an elastomeric solid. Temperatures lower than about 190° C. result in impractically low reaction rates, while temperatures above about 300° C. result in prohibitive decomposition and discoloration of the resulting polyester. The reaction temperature is maintained until a substantial amount of cross-linking by ketol formation through the keto groups of the polyester has occurred, thereby imparting to the polyester the desired elastomeric properties. It has been found that when the acid number of the reaction mixture has been reduced to below 100, the desired amount of cross-linking will have occurred. In two-stage operation the temperatures in each stage and the total reaction time for both stages may be generally similar to the foregoing temperatures and times.

In carrying out the process of the present invention, the ketopimelic acid and the glycol may be heated in open or closed vessels of glass, enamel, iron, aluminum, etc., to the desired temperature until the desired esterification and cross-linking occurs. An atmosphere of inert gas will tend to produce lighter-colored polyesters, and efficient agitation will materially accelerate the process. Reduced or increased pressures at times may be used if desired. An auxiliary condensing system, such as a short air-cooled condenser, may be used. The esterification may be carried out in the presence of various known solvents for such esterification processes that are inert to the polyester formed and to the starting materials.

The following examples will serve to further illustrate the process of the invention.

Example I 34.8 grams (0.2 mol) of 4-ketopimelic acid, 13.7 grams (0.22 mol) of ethylene glycol, and 0.3 gram of a zinc chloride catalyst were charged to a flask equipped with a reflux condenser and a thermometer. The contents of the flask were heated at atmospheric pressure to a temperature within the range 200° to 250° C., and the temperature was maintained in that range for 3.17 hours, at the end of which time the material remaining in the flask after cooling to room temperature was a viscous liquid, substantially comprising a polyester, having no elastomeric properties, having an acid number of 111, i.e., above the acid number required by the process of the present invention.

Example II

The same procedure used in Example I was carried out, using the same materials in the same amounts, and the same conditions, excepting that the temperature was maintained in the stated range for an additional period of time until the material remaining in the flask after cooling to room temperature was a porous elastomeric solid having an acid number below 100 and a reversible elongation of 2:1.

The process of the present invention is a highly effective method of producing the desired elastomeric materials. It can be operated in a manner that permits great flexibility to be obtained in a controlled manner, both as to process operation and product characteristics. The esterification and cross-linking reactions can be controlled separately and independently; this control in connection with other process variables permits very selective results to be chosen and obtained.

We claim:

1. The elastomeric reaction product obtained by reacting approximately equimolar proportions of a ketopimelic acid selected from the group consisting of 2-ketopimelic acid and 4-ketopimelic acid with a lower aliphatic glycol in the presence of an esterification catalyst at a temperature of about from 190° to 300° C. until a polyester of acid number below 100 containing keto substituents has formed and until a substantial amount of cross-linking by ketol formation through said substituents has occurred.

2. The product as in claim 1, wherein said acid is 4-ketopimelic acid and said glycol is ethylene glycol.

3. The process for producing elastomeric materials, which comprises reacting approximately equimolar proportions of a ketopimelic acid selected from the group consisting of 2-ketopimelic acid and 4-ketopimelic acid with a lower aliphatic glycol in the presence of an esterification catalyst at a temperature of about from 190° to 300° C. for a period of time sufficient to produce a liquid reaction mixture substantially comprising a polyester having keto substituents and reacting said polyester with a lower aliphatic glycol for a further period of time to an acid number below 100 and until a substantial amount of cross-linking by ketol formation through said keto substituents has occurred.

4. The process as in claim 3, wherein said acid is 4-ketopimelic acid and said glycol is ethylene glycol.

References Cited in the file of this patent

UNITED STATES PATENTS

| | | |
|---|---|---|
| 1,779,367 | Bruson | Oct. 21, 1930 |
| 2,059,850 | Coolidge | Nov. 3, 1936 |
| 2,665,303 | Gamrath | Jan. 5 1954 |

FOREIGN PATENTS

| | | |
|---|---|---|
| 1,179,094 | France | Dec. 15, 1958 |